US010031864B2

(12) United States Patent
Miller et al.

(10) Patent No.: US 10,031,864 B2
(45) Date of Patent: Jul. 24, 2018

(54) INTEGRATED CIRCUIT

(71) Applicant: Seagate Technology LLC, Cupertino, CA (US)

(72) Inventors: Michael Howard Miller, Eden Prairie, MN (US); Richard Esten Bohn, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 69 days.

(21) Appl. No.: 13/841,805

(22) Filed: Mar. 15, 2013

(65) Prior Publication Data

US 2014/0281277 A1 Sep. 18, 2014

(51) Int. Cl.
*G06F 12/00* (2006.01)
*G06F 12/14* (2006.01)

(52) U.S. Cl.
CPC ...... *G06F 12/1491* (2013.01); *G06F 12/1441* (2013.01); *Y02D 10/13* (2018.01)

(58) Field of Classification Search
CPC .... G06F 13/385; G06F 3/0626; G06F 3/0658; G06F 3/0689; H01L 2924/00014; H01L 2224/97
USPC ........................................................ 711/147
See application file for complete search history.

(56) References Cited

U.S. PATENT DOCUMENTS

| 4,969,188 | A | * | 11/1990 | Schobi | H04L 9/0836 380/277 |
|---|---|---|---|---|---|
| 5,235,586 | A | | 8/1993 | Feamster et al. | |
| 6,212,588 | B1 | * | 4/2001 | Bruner et al. | 710/110 |
| 6,249,167 | B1 | * | 6/2001 | Oguchi | G06F 1/04 327/291 |
| 6,303,989 | B1 | * | 10/2001 | Yasuho et al. | 257/706 |
| 6,535,465 | B1 | | 3/2003 | Shigetomi et al. | |
| 6,694,200 | B1 | | 2/2004 | Naim | |
| 6,709,333 | B1 | * | 3/2004 | Bradford | G07F 17/32 463/29 |
| 7,325,095 | B2 | | 1/2008 | Williams | |
| 7,660,911 | B2 | * | 2/2010 | McDaniel | 710/3 |
| 7,759,902 | B2 | * | 7/2010 | Gangsto | H02J 7/0016 320/132 |
| 8,159,777 | B2 | | 4/2012 | Zadesky et al. | |
| RE43,602 | E | * | 8/2012 | Chu | G06F 21/71 726/2 |
| 8,635,412 | B1 | * | 1/2014 | Wilshire | G06F 13/28 711/118 |
| 2001/0027556 | A1 | * | 10/2001 | Shimosako | H04N 5/44513 725/1 |
| 2003/0227703 | A1 | | 12/2003 | Hinshaw | |
| 2004/0088456 | A1 | | 5/2004 | Zhang | |
| 2006/0195832 | A1 | | 8/2006 | Chandley et al. | |
| 2007/0005996 | A1 | * | 1/2007 | Nalawadi | G06F 1/206 713/300 |
| 2008/0162984 | A1 | * | 7/2008 | Kalra | H04L 41/0213 714/4.11 |
| 2008/0291210 | A1 | * | 11/2008 | Partani | G06F 3/1462 345/545 |

(Continued)

FOREIGN PATENT DOCUMENTS

JP H11-167547 A 6/1999

*Primary Examiner* — Mardochee Chery
(74) *Attorney, Agent, or Firm* — Holzer Patel Drennan

(57) ABSTRACT

A single device that provides computing system-level functionality with non-volatile storage controller functionality. These functionalities can share the same electronics.

18 Claims, 4 Drawing Sheets

(56) References Cited

U.S. PATENT DOCUMENTS

| | | | |
|---|---|---|---|
| 2009/0160266 A1* | 6/2009 | Tatsumi | G06F 1/3203 307/115 |
| 2010/0223397 A1* | 9/2010 | Elzur | H04L 41/0213 709/235 |
| 2012/0173804 A1* | 7/2012 | Gorobets | 711/103 |
| 2014/0101348 A1 | 4/2014 | Armstrong | |

* cited by examiner

INTEGRATED CIRCUIT

SUMMARY

Disclosed is the integration of a computing system and the electronics of a storage media controller (e.g. hard disk drive or solid state drive electronics). Also disclosed are sharing resources, eliminating a storage interface, and substantially maintaining the firmware for both.

DETAILED DESCRIPTION

A computing system is comprised of several distinct components: a central processing unit (CPU), random access memory (RAM), and a mass storage device such a hard disk drive or solid state drive. These components are designed individually and then integrated together, utilizing industry wide agreed-upon (standardized) storage interfaces. For example, a mass storage device may communicate to the rest of the computing system through a standardized storage interface such as SATA, SAS, Fibre Channel or SCSI.

Figure 1:
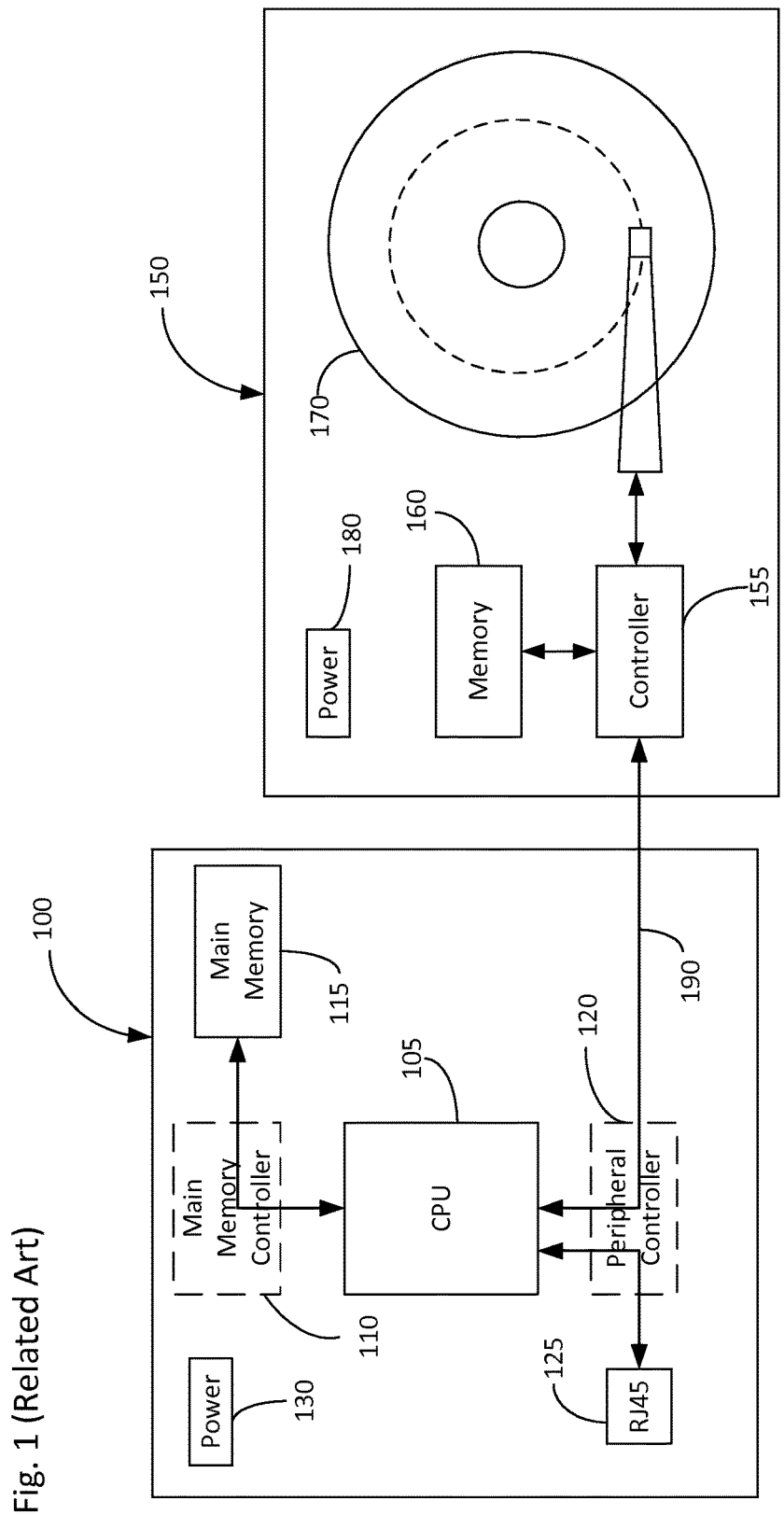
FIG. 1 shows a computing system and a separate mass storage device.

Designing each component individually leads to inefficiencies in the hardware design that increase the cost and power of the overall solution. For example, FIG. 1 shows a computing system 100 coupled to a mass storage device 150. Computing system 100 includes a CPU 105, main memory controller 110 that includes a memory management unit (MMU), main memory 115, peripheral controller 120, RJ45 connector 125 and power supply 130. CPU 105 can have one of various architectures, such as Harvard, modified Harvard, von Neuman or Dataflow. CPU 105 can have one of various instruction sets such as CISC, EDGE, EPIC, MISC, OISC, RISC, VLIW, NISC and ZISC. CPU 105 can be one of various CPUs, such as embedded (e.g., ARM), microcomputer (e.g., Intel x86), workstation/server (e.g., HP PA-RISC), mini/mainframe (e.g., IBM ESA/390) and mixed-core (e.g., IBM's Cell). CPU 105 can be a central processing unit, a digital signal processor, a microcontroller or a custom-design processing unit. CPU 105 can include multi- or parallel processors.

Computing system 100 may include main memory controller 110 and/or peripheral controller 120. Respective examples of a main memory controller and a peripheral controller are Northbridge and Southbridge chips. CPU 105 can include those controllers, thus separate controllers are not needed. Hence their illustration in dashed lines. Main memory 115 can be DRAM, but can also be other types of RAM (e.g., SRAM) or non-volatile memory (e.g., FLASH). RJ45 connector 125 can be used to connect computing system 100 to a network via an Ethernet cable. However, computing system 100 can use other kinds of communication channels like wireless, coaxial cable, and can use one of various types of communication protocols. Power supply 130 provides voltage and current to any or all of the components of computing system 100.

Mass storage device 150 is shown as a disc drive, and includes a controller 155 that accesses data on media 170. Controller 155 is coupled to memory 160, which may be the same or different type of memory as main memory 115. Power supply 130 provides voltage and current to any or all of the components of mass storage device 150.

When the computing system 100 retrieves data from the mass storage device 150, mass storage device 150 may first buffer the data in memory 160 and then transfer the data over a storage interface 190 to computing system 100. The data then is placed in main memory 115 in computing system 100. This transfer across storage interface 190 consumes both hardware resources (e.g., ASIC core die area and pad ring area) and power that could be avoided with a more efficient solution. One inefficiency is the power needed to transmit data over the cable between computing system 100 and mass storage device 150.

Figure 2:
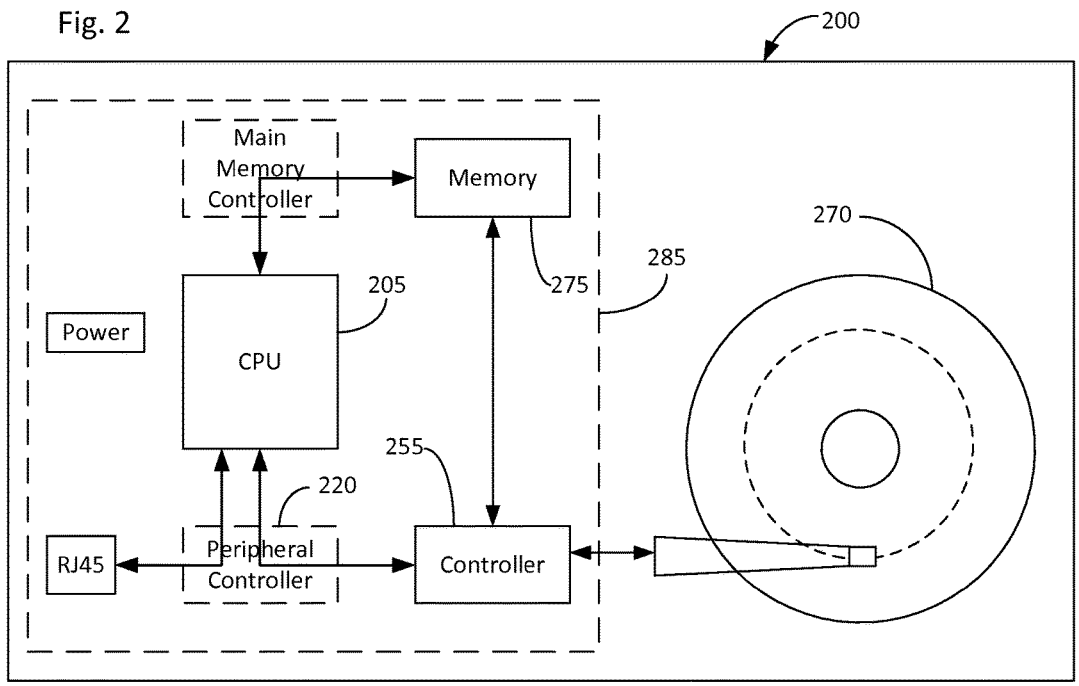
FIG. 2 shows variations of an integrated computing system and storage media controller.

One such efficient solution is achieved by integrating components of computing system 100 with mass storage device 150, optimizing away inefficiencies such as the power needed to transmit data over the cable. FIG. 2 illustrates this. A device 200 includes CPU 205, main memory controller 210, peripheral controller 220, RJ45 connector 225, power supply 250, controller 255 and media 270, all which can be the same as described for FIG. 1. However, with the integration of the computing system with the mass storage device, some components may be shared, increasing overall efficiency. First, power supply 250 provides power to all the components instead of the two separate power supplies shown in FIG. 1. Furthermore, memory 275 is utilized by both CPU 205 and controller 255 instead of the two separate memories shown in FIG. 1. Thus, the device is a lower power and a more cost-effective system solution. In addition, all components except media 270 can be mounted on a printed circuit board (PCB) 285.

Figure 3:
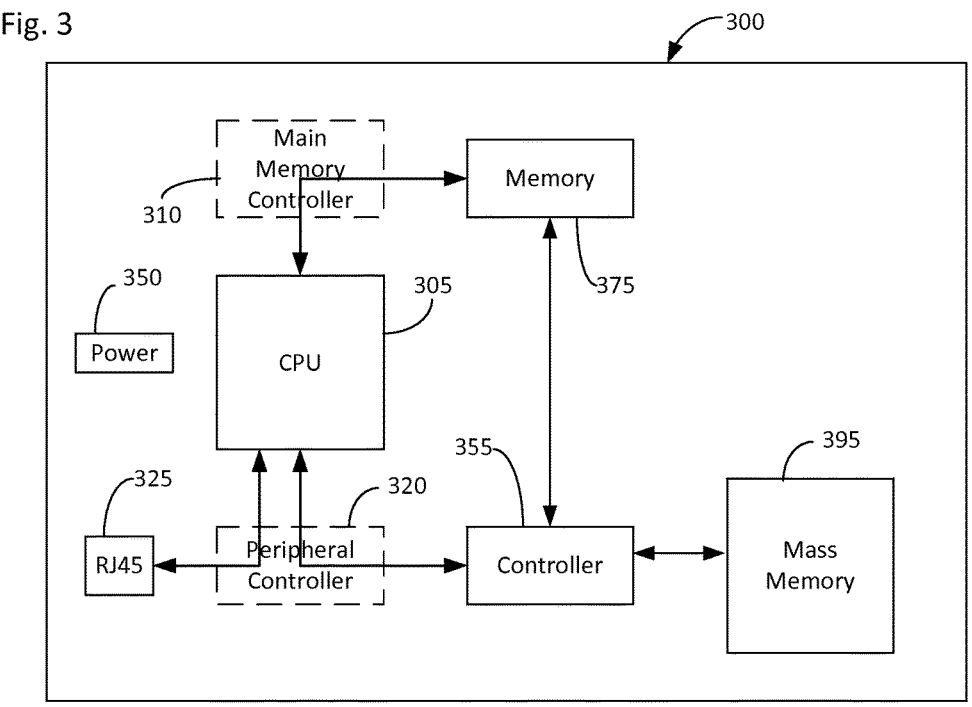
FIG. 3 shows another variation of an integrated computing system and storage media controller.

FIG. 3 illustrates integrating components of a computing system with a mass storage device. A device 300 includes CPU 305, main memory controller 310, peripheral controller 320, RJ45 connector 325, power supply 350, controller 355 and memory 375, all which can be the same as described for FIG. 2. Instead of media 270, device 300 includes a solid-state mass memory 395. Mass memory 395 can be, for example, FLASH, STRAM, MRAM or ReRAM. Mass memory 395 can also be removable memory, such as SD, CF, SIMM or DIMM.

Again, with the integration of the computing system with the mass storage device, a few components can be shared. Power supply 350 provides power to all the components instead of the two separate power supplies shown in FIG. 1. Furthermore, memory 375 is utilized by both CPU 305 and controller 355 instead of the two separate memories shown in FIG. 1. In addition, all components including mass memory 395 can be mounted on a printed circuit board (PCB) 385. Thus, the device is lower power and a more cost-effective system solution.

Figure 4:
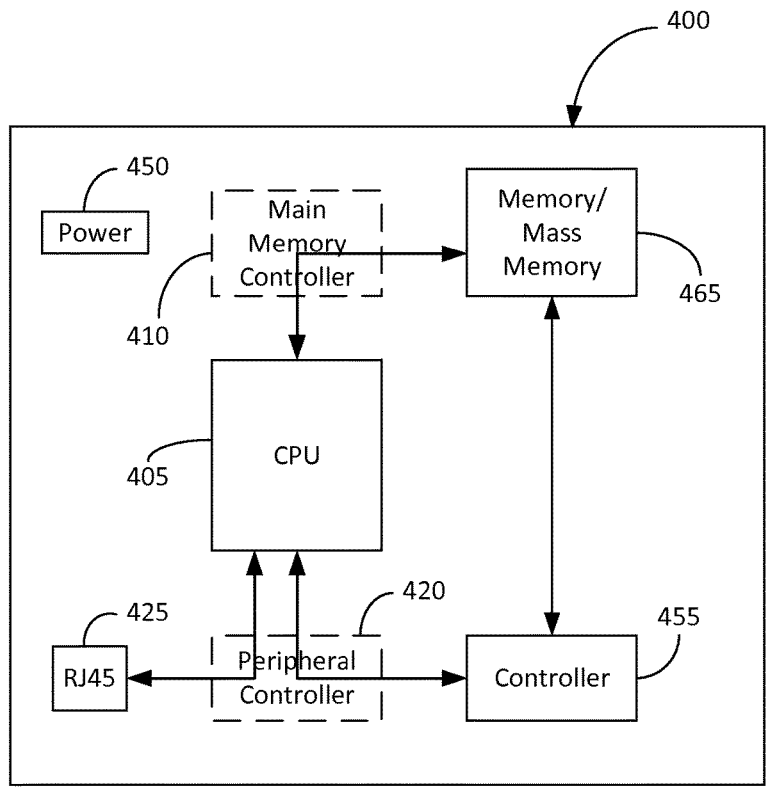
FIG. 4 shows a further variation of an integrated computing system and storage media controller.

FIG. 4 illustrates integrating components of a computing system with a mass storage device. A device 400 includes CPU 405, main memory controller 410, peripheral controller 420, RJ45 connector 425, power supply 450 and controller 455, all which can be the same as described for FIG. 2. Device 400 includes memory/mass memory 465. Memory/mass memory 465 can be, for example, FLASH, STRAM, MRAM or ReRAM. Memory/mass memory 465 can also be removable memory, such as SD, CF, SIMM or DIMM. Here, memory/mass memory 465 functions as both the memory and mass memory described above.

In addition to the component sharing of power supply 450, the memory portion of memory/mass memory 465 is also shared. Here memory/mass memory 465 can be the same kind of memory (e.g., FLASH) used for both the memory and mass memory portions. Generally, memory/mass memory 465 should exhibit access speeds similar to those of the memory part, such as a DRAM, while being nonvolatile like flash or magnetic media.

Controller 455 can include various storage functions such as buffer management, caching algorithms, command queuing functions, and error detection and correction. For instance, a substantial amount of signal processing hardware dedicated to ensuring correct data is recovered from the memory/mass memory 465 can be in controller 455. This hardware can be tightly-coupled to the characteristics of the non-volatile medium being managed for optimal operation. CPU 405 may not have the hardware logic to perform such a function, or may not have an architecture to optimally perform such a function. Furthermore, elimination of any of those functions may not be desirable for certain applications. For instance, high integrity data needs would not tolerate sub-optimal error recovery. Thus, the inclusion of controller 455 in device 400.

Figure 5:
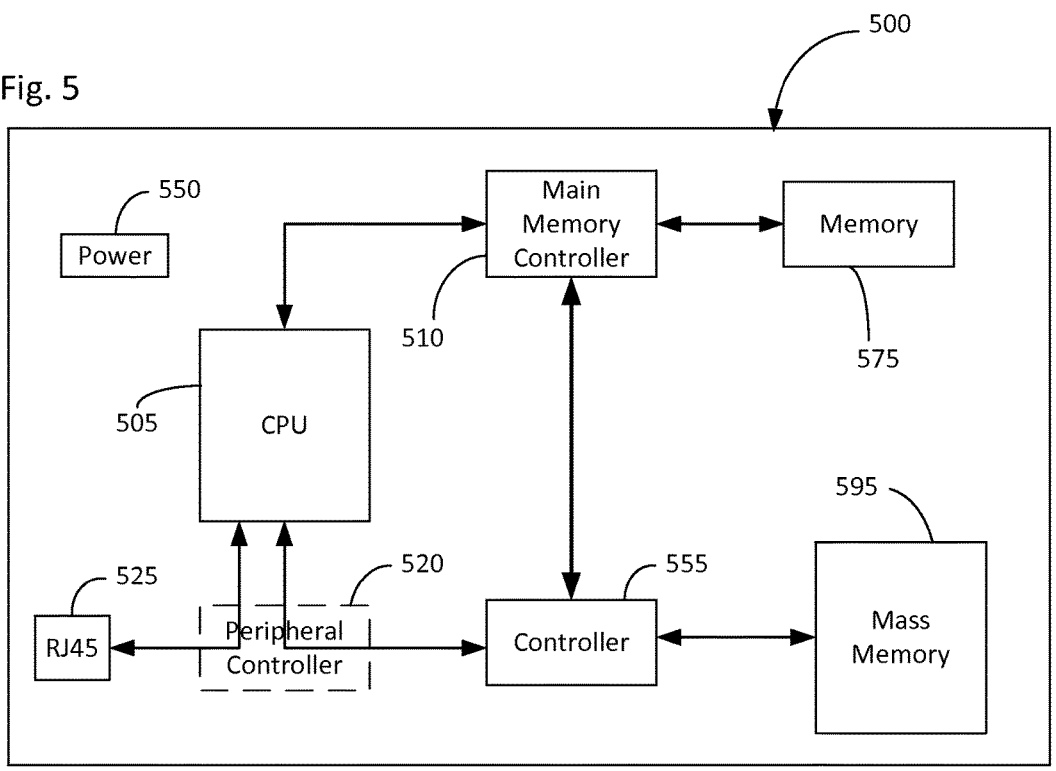
FIG. 5 shows yet a further variation of an integrated computing system and storage media controller.

FIG. 5 illustrates integrating components of a computing system with a mass storage device. A device 500 includes CPU 505, main memory controller 510, peripheral controller 520, RJ45 connector 525, power supply 550, controller 555, memory 575 and mass memory 595, all which can be the same as described for FIG. 3. Along with sharing power supply 550, controller 555 shares main memory 510 controller with CPU 505. This can provide for more efficient DRAM allocation policies, such as when data moves from storage sub-system to the computing sub-system. More efficient DRAM allocation policies can also be achieved when the data need not physically move to a different location in DRAM or only a software pointer needs to be exchanged.

Figure 6:
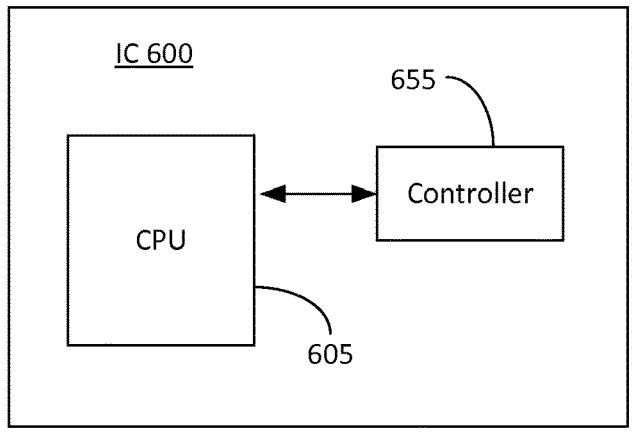
FIG. 6 shows an integration variation.
Figure 7:
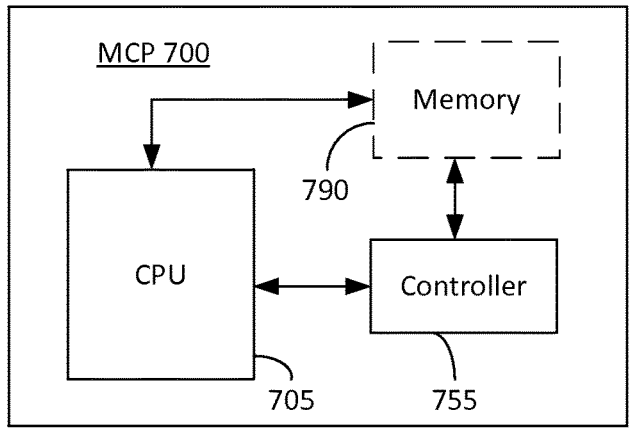
FIG. 7 shows another integration variation.
Figure 8:
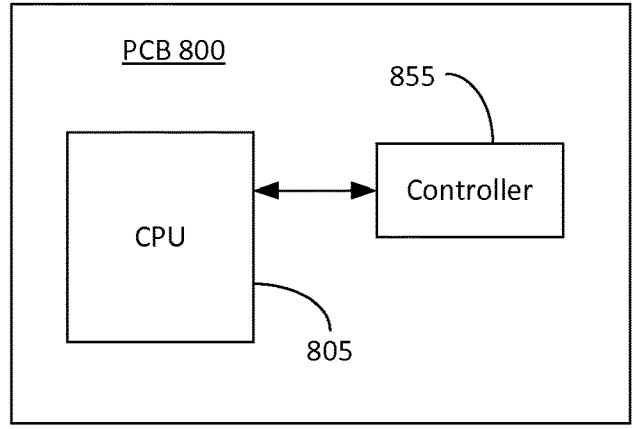
FIG. 8 shows a further integration variation.

FIGS. 6-8 show various CPU and controller integration configurations. These variations can be applied to any of the devices shown in FIGS. 2-5 and described above. FIG. 6 shows CPU 605 and controller 655 being on the same integrated circuit 600. Memory and/or mass memory may also be on the same integrated circuit 600. Because of this integration, certain aspects of the storage interface (e.g., 190 in FIG. 1) can be eliminated or modified. For example, the hardware and low-level software stack associated with managing the physical storage interface can be eliminated, improving system power and reducing complexity. The storage interface hardware and software stack can be replaced by much simpler software APIs.

In a more specific example, the SATA standard defines physical, link and transport layers. Part or all of the physical layer can be eliminated. In this case, the link layer of the MMU (either separate from or part of CPU 605) and the link layer of controller 655 can be coupled together, which allows for the elimination of the physical layer. The link layer may also be eliminated. Following that, the transport layer may be eliminated. The MMU and controller 655 would then communicate at an application layer. Elimination of any of these layers may also cause the modification of the storage driver (e.g., of an operating system) running on the CPU. Also, the actual command structure of the storage interface can be maintained, eliminated or modified based on the elimination of any of those layers.

In addition, potentially the storage interface can be a custom or non-standardized interface. One example this is the host interface logic of controller 655 can be coupled to the associated logic of CPU 605. Another example is the communication between the peripheral controller and controller 655 can be implemented primarily by passing messages between the peripheral controller and controller 655 through the single shared memory.

FIG. 7 shows a multichip package (MCP) 700 that includes a CPU 705, a controller 755 and an optional memory 790. In this case each are separate integrated circuits that are bonded to a substrate of multichip package 700. Alternatively, the integrated circuits may be stacked. FIG. 8 shows a printed circuit board (PCB) 800 that includes a CPU 805 and a controller 855. CPU 805 and controller 855 can be in separate packages.

The firmware for the CPUs and controllers integrated as described above can be run concurrently with slight modifications. To illustrate, the data transfer protocol used on the storage interface between CPU 605 and controller 655 of FIG. 6 is maintained. Since CPU 605 and controller 655 share the same DRAM, a software pointer can be exchanged between CPU 605 and controller 655 without moving the data within the DRAM. This saves time because the data does not have to be moved. Thus, the firmware for the data transfer protocol is slightly modified to include that software pointer. Slightly modifying the firmware for both the CPU and the controller would allow them to substantially maintain their reliability. This will allow for the quick integration and testing of the CPU and the controller in a device.

The firmware for the CPUs and controllers integrated as described above can be run concurrently with substantial modifications to the data storage protocol. This can happen, for example, when the data transfer protocol used on the storage interface between CPU 605 and controller 655 is customized. The customization would be instantiated in substantial modifications to the firmware. Although the modifications are substantial, they should only affect specific functions of the firmware and not the entire firmware. As such, this will allow for quicker integration and testing of the CPU and the controller in a device than combining the firmware, but will be slower than a device using the slight modifications described above.

The firmware for the CPUs and controllers integrated as described above can be combined. This can done to optimize the firmware for the entire device. Also, the device can execute the storage controller firmware code on the same microprocessor as the software code for the computing system. This saves hardware resources by allowing for more efficient load-based allocation of processing resources. However, this can entail quite substantial modifications to the firmware. One consequence can be that the reliability of the so-modified firmware is less reliable than the separate firmware and the firmware modifications described above. Then integration and testing of the device may be hampered.

With some of the apparatus described above, security challenges may arise in maintaining the integrity of the storage device firmware operating on the controller. A hypervisor can be employed to manage the sharing of resources between the computing system software (e.g. linux) and controller firmware, allowing each to have protected memory spaces not accessible by the other while still sharing the same physical memory. In the same way, the hypervisor can manage which code is allowed to access which hardware resources that may be present in the same physical ASIC. For example, the hypervisor may prevent the system software from accessing the hardware configuration registers associated with a hard disk drive's read channel signal processing hardware, while granting access to the same hardware to the storage controller firmware. The hypervisor preferably is not updatable by the end user of the storage device The device of FIG. 6, for example, can enhance security by preventing so-called "man-in-the-middle" attacks. For instance, low-level data access to and from an encrypted drive can be intercepted and compromised. By integrating the system controller and storage controller into a single device (e.g., device IC 600 of FIG. 6), these kinds of security breaches can be prevented.

The described apparatus and methods should not be limited to the particular examples described above. Various modifications, equivalent processes, as well as numerous structures to which the described apparatus and methods may be applicable will be readily apparent. For example, the functionality of the controller may be performed by the CPU, to eliminate the controller.

What is claimed is:

1. A device comprising:
    an integrated circuit integrating components of a computing system and a mass storage device, wherein the integrated circuit includes:
        a CPU operably connected to a media in the mass storage device;
        a peripheral controller operably coupled to the CPU;
        a storage controller operably coupled to the peripheral controller, operably in communication with the CPU through the peripheral controller using a storage interface, and operably in communication with the media;
        a shared power supply operably connected to the CPU, wherein the shared power supply provides power to all components in the device;
        a shared mass memory operably coupled to the CPU and the storage controller, wherein the shared mass memory is utilized by the CPU and the storage controller by using a software pointer to share data between the CPU and the storage controller; and
        a main memory controller including a memory management unit operably coupled to the CPU and the mass memory.

2. The device of claim 1 wherein the storage interface is standardized.

3. The device of claim 1 wherein the storage interface is one of SCSI, SAS, SATA and FC, USB UAS, SOP/PQI, or NVMe.

4. The device of claim 1 wherein the peripheral controller and the storage controller communicate directly over a physical layer of the storage interface.

5. The device of claim 1 wherein the peripheral controller and the storage controller communicate directly over a link layer of the storage interface.

6. The device of claim 1 wherein the peripheral controller and the storage controller communicate directly over a transport layer of the storage interface.

7. The device of claim 1 wherein the peripheral controller and the storage controller communicate directly over an application layer of the storage interface.

8. A storage device comprising:
    an integrated circuit operably connected to a mass storage device and integrating components of a computing system and the mass storage device, wherein the integrated circuit includes:
        a shared mass memory;
        a CPU;
        a shared power supply operably connected to the CPU, wherein the shared power supply provides power to all components in the storage device;
        a main memory controller including a memory management unit operably coupled to the CPU, wherein the shared mass memory is utilized by the CPU and a controller of the memory management unit using a software pointer to share all data between the CPU and the storage controller;
        a peripheral controller operably coupled to the CPU; and
        a storage controller operably in communication with the mass memory and in communication with the CPU through the peripheral controller using a storage interface.

9. The storage device of claim 8 further comprising a memory device operably coupled to the memory management unit, and a second memory device operably coupled to the storage controller.

10. The storage device of claim 8 further comprising a single memory device operably coupled to the memory management unit, and the storage controller operably coupled to the memory management unit.

11. The storage device of claim 10 further comprising security measures that protect from undesired access to CPU memory regions of the single memory device and that protect from undesired access to storage controller memory regions of the single memory device.

12. The storage device of claim 11 wherein the security is further enhanced by a hypervisor that manages allocation of the single memory device between the CPU and the storage controller.

13. The storage device of claim 12 wherein the hypervisor is not updatable by the end user of the storage device.

14. The storage device of claim 10 wherein communication between the peripheral controller and the storage controller is implemented by passing messages through the shared single memory device.

15. A device comprising:
    an integrated circuit integrating components of a computing system and a mass storage device, wherein the integrated circuit includes:
        a CPU;
        a storage controller operably in communication with the CPU using a storage interface;
        a shared power supply operably connected to the CPU, wherein the shared power supply provides power to all components in the device; and
        a shared mass memory operably coupled to the CPU and a controller, wherein the shared mass memory is utilized by the CPU and the controller by using a software pointer to share data between the CPU and the controller.

16. The storage device of claim 8, further comprising one memory, wherein the CPU and storage controller both utilize the one memory.

17. The storage device of claim 8, wherein the mass memory and the integrated circuit are mounted on a single printed circuit board.

18. The device of claim 15, wherein the mass memory and the integrated circuit are mounted on a single printed circuit board.

* * * * *